US011968095B2

(12) United States Patent
Westerhof

(10) Patent No.: US 11,968,095 B2
(45) Date of Patent: Apr. 23, 2024

(54) CAPTURING AND CORRELATING MULTIPLE SOURCES OF DEBUGGING INFORMATION RELATING TO A NETWORK RESOURCE VIA A BROWSER EXTENSION

(71) Applicant: Fortinet, Inc., Sunnyvale, CA (US)

(72) Inventor: Mark D. Westerhof, Port Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/836,900

(22) Filed: Mar. 31, 2020

(65) Prior Publication Data

US 2021/0306226 A1    Sep. 30, 2021

(51) Int. Cl.
*H04L 41/22* (2022.01)
*G06F 16/958* (2019.01)
*H04L 41/069* (2022.01)
*H04L 67/02* (2022.01)

(52) U.S. Cl.
CPC .......... *H04L 41/22* (2013.01); *G06F 16/986* (2019.01); *H04L 41/069* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 7,647,631 B2 * | 1/2010 | Sima | G06F 21/577 709/201 |
| 9,747,191 B1 * | 8/2017 | Marolia | G06F 11/3466 |
| 10,853,218 B1 * | 12/2020 | Beaman | G06F 11/3438 |
| 2002/0087949 A1 * | 7/2002 | Golender | G06F 11/323 717/124 |
| 2014/0317602 A1 * | 10/2014 | Zuo | G06F 11/362 717/125 |
| 2017/0063653 A1 * | 3/2017 | Kieviet | G06F 11/3466 |
| 2020/0356461 A1 * | 11/2020 | Ritter | G06F 11/349 |

* cited by examiner

*Primary Examiner* — Moustafa M Meky
*Assistant Examiner* — Mohammad Yousuf A. Mian
(74) *Attorney, Agent, or Firm* — Law Office of Dorian Cartwright; Dorian Cartwright

(57) ABSTRACT

Systems and methods for capturing and correlating multiple sources of debugging information relating to a network resource and a client device via a browser extension are provided. A browser extension integrated within a browser running on a client device, receives a request to initiate capturing of debugging information relating to a potential bug associated with a network resource with which an end user is interacting via the browser, and in response to the first request, starts capturing the debugging information from multiple sources and correlates the multiple sources to facilitate time-synchronized playback. On receipt of a second request, the browser extension stop capturing debugging information, and creates a single compressed file containing the debugging information collected from the multiple sources. The single compressed file may then be shared with a second device, which can playback the correlated debugging information.

17 Claims, 11 Drawing Sheets

CAPTURING AND CORRELATING MULTIPLE SOURCES OF DEBUGGING INFORMATION RELATING TO A NETWORK RESOURCE VIA A BROWSER EXTENSION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to debugging and reporting of debug information relating to a network resource. In particular, embodiments of the present invention relate to capturing debugging information for a network security device through an auxiliary application integrated with a web browser.

Description of the Related Art

While interacting with a network resource (e.g., in the form of a remote computer system, a user interface or other application running on the remote computer system, or a web application), which may include software, hardware or a combination of both, via a web browser running on a local computer system, an end user may encounter an issue with the network resource that the end user would like to report to appropriate stakeholders (e.g., a local information technology (IT) administrator or a development team or technical support personnel of a manufacturer, distributer or service provider of the network resource). Typically, reporting issues to technical support services involves making a call or opening a technical support case via a technical support portal.

In order, for developers to identify and fix a problem in a timely fashion, it is helpful to have a variety of types of debugging information. In most cases today, multiple back and forth communications may be required among various of the stakeholders (e.g., the customer, customer support staff, quality assurance team members, and developers) asking for more information, better screenshots/videos, different debug logs, etc. More often than not, needed information is missing, or captured at the incorrect time. Meanwhile, even after all the desired information is gathered, it can be difficult to correlate it all together.

SUMMARY

Systems and methods are described for capturing and correlating multiple sources of debugging information relating to a network resource and a client device via a browser extension. According to one embodiment, a first request to initiate capturing of debugging information relating to a potential bug associated with a network resource with which an end user is interacting via a browser running on a client device is received by a browser extension integrated within the browser. Responsive to the first request, the browser extension captures the debugging information, including (i) a video recording of information displayed via the browser on a display of the client device depicting the potential bug and real-time user interactions with the network resource leading up to the potential bug; and (ii) one or more of (a) information regarding utilization of one or more computational resources of the client device over a period of time commencing at a time at which the first request was received by the browser extension; (b) information regarding utilization of one or more computational resources of the network resource over the period of time; (c) Hypertext Transport Protocol (HTTP) network logs containing information regarding HTTP requests issued by the client device and information regarding HTTP responses issued by the network resource over the period of time; (d) meta information associated with the network resource; and (e) meta information associated with one or both of the client device and the browser. As the debugging information is captured the browser extension correlates the sources of information by time stamping the sources of information. A second request to stop capturing of the debugging information is received by the browser extension responsive to which the browser extension persists the sources of information.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
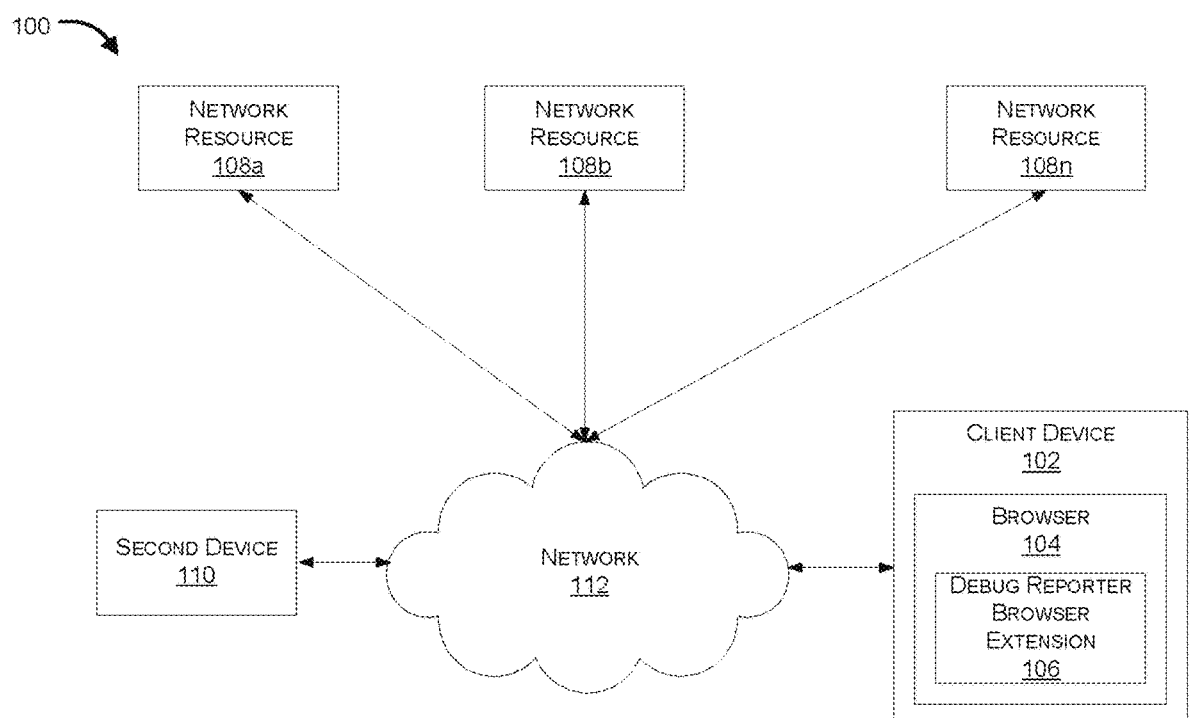
FIG. 1 illustrates an ecosystem of connected devices that may be used for reporting debugging information related to a network device through a browser extension in accordance with an embodiment of the present invention.

Systems and methods are described for capturing and correlating multiple sources of debugging information relating to a network resource and a client device via a browser extension.

Existing mechanisms for submitting bug reports have various deficiencies. For example, the submission may not have enough information to allow a developer to understand and/or reproduce the potential bug being reported. As such, multiple rounds of conversations may be required among various stakeholders, including the end user reporting the issue, customer support staff, quality assurance team members, developers, and others in an attempt to gather additional information regarding the source and/or triggering conditions. Additionally, the end user may not know what information would be relevant to share with the technical support personnel in order to enable the technical support personnel to sufficiently understand the issue so as to be able to provide appropriate assistance in connection with attempting to resolve the issue. Furthermore, the issue being experienced by the end user may involve any or a combination of an error associated with the network resource, operator error (e.g., wrong field selection or data entry by the end user), network connectivity issues, an error in the browser code, inter-process communication issues, and a failure associated with an application programing interface (API) call.

There are systems that enable users to report any issues or bugs or problems to a concerned person. Generally, these systems allow a user to describe an issue they are facing and also allow them to attach some snapshot or other details while reporting the issue. However, the reported information might not be enough to take any conclusive decision by the concerned person.

The existing systems do not provide comprehensive information, such as what action user is taking, how a user device is responding, what network requests are sent, what actions are taken by network device or network resource, utilization information about local resource or network resource etc. To understand the issue, the concerned person may require all the information and may further need to correlate information by analyzing the reported issue and logs from different devices, which is a complex task.

For an example, when there is any issue with a networking device, user may want to report issue to a customer care team, that may further require reporting of the issue to a development or product team who may have developed the networking device. When the user reports the issue, they normally fill out a form indicating what they are trying to do and what is not working, but in order for the customer care team or the development team to resolve the issue they may need more information, which may not be easy for the user to provide.

Therefore, there is a need for a system and method which allows a user to capture, to determine an issue and enable comprehensive reporting of debug information to a concerned person. The issue might relate to a networking device, or network resource or network service and the user reporting the issue may be anyone including, but not limiting to, an end user, a field technician, a member of the customer care team, a system tester, a quality assurance person, etc. Similarly, the concerned person may be anyone including, but not limiting to, a system developer, a software developer, a hardware developer, a product manager, a customer care executive trying to resolve the reported issue, and a technical assistant trying to resolve the issue.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

As used herein a "network resource" generally refers to various forms of data, information, services, applications and/or hardware devices that may be accessed via a network (e.g., the Internet). Non-limiting examples of network resources include web applications, cloud-based services, network devices and/or associated applications (e.g., user interface applications), and network security devices and/or associated applications (e.g., user interface applications).

As used herein a "web browser extension," a "browser extension," or simply an "extension" generally refers to a program (in source code form or in executable form) that may be integrated with a web browser for the purpose of changing the web browser's functionality, including adding new features to the web browser or modifying the existing behavior of the web browser. Web browser extensions include software modules (in the form of extensions or plug-ins) or other auxiliary applications that may be integrated with or otherwise installed within a web browser (e.g., the Google Chrome web browser, the Internet Explorer web browser, the Mozilla Firefox web browser, the Safari web browser, the Opera web browser, or the Konqueror web browser).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

FIG. 1 illustrates an ecosystem 100 of connected devices that may be used for reporting debugging information related to a network device through a browser extension in accordance with an embodiment of the present invention. In the context of the present example, the ecosystem 100 enables a client device 102 to capture and report debugging information related to a network resource (e.g., network resource 108a-n) with which it is interacting.

In one embodiment, the client device 102 has installed therein a debug reporter browser extension 106 (which may be referred to simply as browser extension 106), integrated with a browser 104. As described in further detail below, the browser extension 106 may enable a user to capture and playback debugging information related to network resources 108a-n (which may be collectively referred to as network resource 108) with which the client device 102 is interacting via a network 112.

In some embodiments, network resource 108 may include any or combination of resources, such as web applications, cloud-based services, network devices and/or associated applications (e.g., user interface applications).

In an embodiment, responsive to receipt of a first request, via a graphical user interface (GUI) of the browser extension 106, to start capturing debugging information relating to a potential bug associated with a network resource 108 with which an end user is interacting through the browser 104, the browser extension 106 starts capturing debugging information.

In an embodiment, the debugging information includes information from multiple sources including, but not limited to, (i) a video recording of information displayed via the browser 104 on a display of the client device 102 depicting the potential bug and real-time user interactions with the network resource 108 leading up to the potential bug, and (ii) other debugging information. The other debugging information may include any or combination of information regarding utilization of one or more computational resources of the client device 102 over a period of time commencing at a time at which the first request was received by the browser extension 106, information regarding utilization of one or more computational resources of the network resource over the period of time, network logs (for example, Hypertext Transport Protocol (HTTP) network logs) containing information regarding network requests (for example, HTTP requests) issued by the client device 102 and information regarding responses (HTTP responses) issued by the network resource over the period of time, meta information associated with the network resource, and meta information associated with one or both of the client device and the browser.

Further, responsive to receipt of a second request, via the GUI of the browser extension 106, to stop capturing the debugging information, a single compressed file containing time-synchronized debugging information collected from multiple sources may be created by the browser extension 106 and stored within a file system of the client device 102. The single compressed file may include a video recording file associated with the video recording and several other files pertaining to different information or logs collected from multiple sources. In one embodiment, the browser extension 106 correlates the debugging information by adding timestamps associated with different information collected from the multiple sources. Depending upon the particular implementation, the single compressed file may be stored in a predetermined file format of a number of well-known compressed file formats (e.g., a ZIP file format, a RAR format file, a cabinet (CAB) format file, an ARJ format file, a LZH format file, a TAR format file, GZip format file, a UUE format file, an ISO format file, a BZIP2 format file, a Z format file and 7-Zip format file). Alternatively, the user may be provided with an opportunity to select a target file format.

In an embodiment, the collected debugging information (e.g., in the form of a single compressed file) can be shared through the network 112 to a second device 110 (e.g., accessible to a technical support team for the network resource at issue). For example, the user of the client device 102 may share the single compressed file through the network 112 to the second device 110, for example a developer device, which can playback the debugging information in a time-synchronized manner based on the timestamps, for example, via a browser installed on the second device 112.

In an embodiment, the debugging information can be correlated in a time-synchronized manner at the client device 102 before creating the single compressed file (e.g., by timestamping the debugging information as it is collected from the various sources).

In an embodiment, the single compressed file can be shared through a third-party tool (for example, bug reporting software) to the second device 110 or to any concerned person while reporting a bug. On the second device 110, a second user (for example, a developer) may extract the debugging information from the single compressed file via a counterpart application, for example a developer-side browser extension that playbacks the correlated debugging information in a time-synchronized manner. During playback of correlated debugging information, multiple windows may simultaneously display different captured debugging information synchronized according to the timestamps collected during capture of the debugging information by the browser extension 106.

In some embodiments, the captured debugging information is analyzed to present selective debugging information to the user of the second device 110 based on listed features of the network resource being tested. Selection of debugging information from among all the collected debugging information may be performed using a machine-learning model. For example, the machine-learning model can be trained to understand the type of issue or bug reported and most relevant debug information associated with the particular issue or bug.

Using embodiments of the present disclosure, the concerned person, for example a developer, need not attempt to review various logs and try to manually correlate logged events with actions taken by the user of the client device 102 while debugging the network device 108. Instead, all the debugging information is correlated and presented to the developer in a manner that facilitates quick understanding of the bug being reported as well as contextual information from a number of sources.

The issue or bug or problem, referred collectively and interchangeably as issue or bug may relate to hardware, software, a GUI, or any services associated with the network resource being debugged.

In an embodiment, a video recording of information displayed via the browser 104 on a display of the client device 102 depicting the potential bug and real-time user interactions with the network resource (for example, network device 108), is captured by a screen video capturing tool integrated within the browser extension. The video recording includes all the activity of the user on the client device including but not limiting to movement of cursor, selection of menu options within a GUI of an interactive application associated with the network resource and commands issued to the browser 104, client device 102 and network resource 108. The video recording may include a timeline or timestamp information, so it can indicate at what time different events took place. Depending upon the particular implementation, timestamps associated with the video recording may be derived from a local clock of the client device, set with reference to a network accessible time service (e.g., the National Institute of Standards and Technology (NIST) Internet time service) or can simply start with time 00:00 on receipt of the first request.

In an embodiment, debugging information may include information regarding utilization of one or more computational resources of the client device 102 over a period of time commencing at a time at which the first request was received by the browser extension 106 and information regarding utilization of one or more computational resources of the network resource over the period of time. The computational resources may include CPU, memory, network, and/or other hardware and software resources. The debugging information may also include Hypertext Transport Protocol (HTTP) network logs containing information regarding HTTP requests issued by the client device 102 and information regarding HTTP responses issued by the network resource over the period of time, meta information associated with the network resource, and meta information associated with one or both of the client device and the browser 104. The meta information may include metadata including, but not limited to, a version of operating system of the client device 102, a version of the operating system of the network resource 108, a version of the browser 104, a version of the GUI application associated with the network resource 108, the duration for which debugging information is being reported, the date and time of the capture, a capture version, the number of requests made by the client device 102 to the network resource 108 being debugged and to other network resources, and the like.

In an embodiment, the first request and the second request may be received as a result of manual selection of a GUI interface object (e.g., a start or stop button) by a user presented via the GUI of the browser extension 106. Alternatively, the first request may be received automatically when a user starts a debugging session relating to the network resource from the client device 102 and similarly the second request may be received automatically when the user ends the debugging session.

Figure 2:
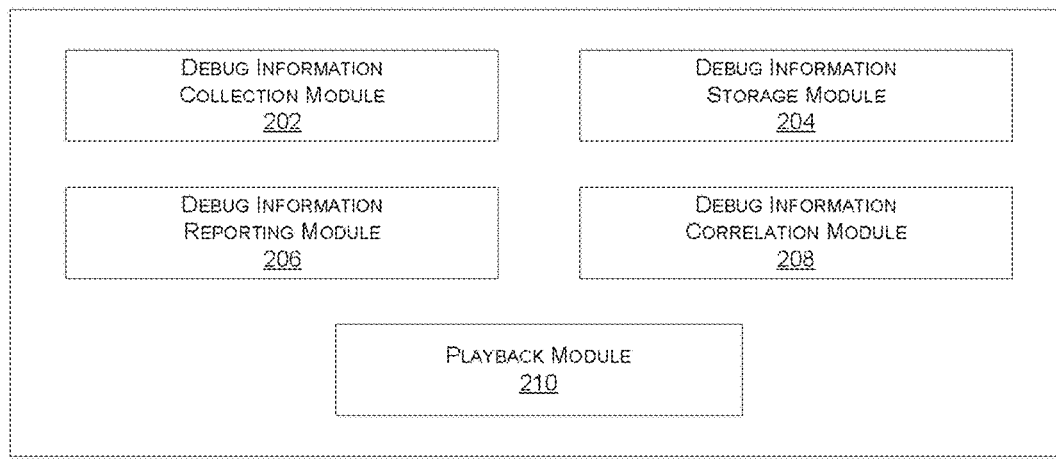
FIG. 2 is a block diagram illustrating functional modules of a system in accordance with an embodiment of the present invention.

FIG. 2 is a block diagram illustrating functional modules of a system 200 in accordance with an embodiment of the present invention. The system 200 may be used for collection of debugging information, reporting of collected debugging information, correlating the debugging information, and playing back the debugging information in time-synchronized manner. As discussed above, in one embodiment, the system 200 is implemented in the form of a browser extension (e.g., browser extension 106).

In the context of the present example, the system 200 includes a debug information collection module 202, a debug information storage module 204, a debug information reporting module 206, a debug information correlation module 208, and a playback module 210.

The debug information collection module 202 may be responsible for starting and stopping the collection of debugging information related to a network resource (e.g., network resource 108), for example, responsive to receipt of requests from an end user to start and stop collecting the debugging information.

In one embodiment, the debug information storage module 202 is operable to collect debugging information during a debugging information collection session (e.g., commencing upon receipt of the first request to start capturing debugging information and ending upon receipt of the second request to stop capturing the debugging information) and store all collected debugging information in a single compressed file. The debugging information collection module 202 may gather debugging information from multiple sources, and may include a video recording of information displayed via a browser (e.g., browser 104) on a display of a client device (e.g., client device 102) depicting the potential bug and real-time user interactions with the network resource leading up to the potential bug. The debugging information collected from the multiple sources may include information regarding utilization of one or more computational resources of the client device over a period of time commencing at a time at which the first request was received by the browser extension, information regarding utilization of one or more computational resources of the network resource over the period of time, network logs containing information regarding network requests issued by the client device and information regarding responses issued by the network resource over the period of time, meta information associated with the network resource, and meta information associated with one or both of the client device and the browser. In an embodiment, all debugging information collected from multiple sources and the video recording are timestamped using a uniform time reference to facilitate subsequent time-synchronized playback of the debugging information by the end user and/or by technical support personnel supporting the network resource.

According to one embodiment, the debug information collection module 202 directs the various entities (e.g., the network resource and the browser) to capture the desired debugging information or otherwise enter into a logging mode. For example, the browser and/or the network resource may be directed to redirect log information to temp files in a location accessible to the debug information collection module 202 that can then be periodically requested and/or captured by the debug information collection module 202.

According to one embodiment, the debug information collection module 202 allows a user to select one or more network resources to debug and one or more logs to be collected from the network resources when the first request to initiate collecting debugging information is received. For example, a GUI of the browser extension may allow the user to select the one or more network resources to debug and the one or more debug logs to be collected.

In an embodiment, the debug information storage module 204 is operable to store the collected debugging information on the client device in a single compressed file or in a special format file containing the collected debugging information.

In an embodiment, the debug information reporting module 206 is operable to report the collected debugging information to a concerned person. For example, the debug information report module 206 can enable the user of the client device to report an issue and also attach the single compressed file or the special format file. The debug information reporting module 206 may allow the user to report the issue through the browser extension itself or through a third party application, like a bug reporting tool. The user may describe a high-level issue being experienced and attach the single compressed file containing the collected debugging information while reporting the issue to the concerned person.

The debug information correlation module 208 is operable to read the timestamps associated with the collected debugging information and the timestamps associated with the video recording and correlate the debugging information in a time-synchronized manner. In this manner, during playback, all the events (e.g., user interactions, logged events, resource utilization levels, etc.) may be presented in the order in which they were observed and debugging information may be presented concurrently with the video recording.

The playback module 210 may be operable to play the debugging information in a time-synchronized manner. For example, the playback module 210 may enable a user on a second device to upload the single compressed file and playback the debugging information via multiple simultaneous windows, each containing different information collected from different sources during the collection of debugging information. The playback module 210 enables a user on the second device to see the events as they happened at the client device as well as events logged at one or more network resources including the video recording of user activity on the client device and meta information at the same time. As the user, who may be a developer or a customer support staff, can view all the activity happening on any given time, it will help the user understand the issue quickly and make necessary correction. The playback module 210 can enable a user to particularly select one or more logs to be viewed in parallel to the video recording and display charts associated with resource utilization at the client device as well as that of the one or more network resources.

Figure 3:
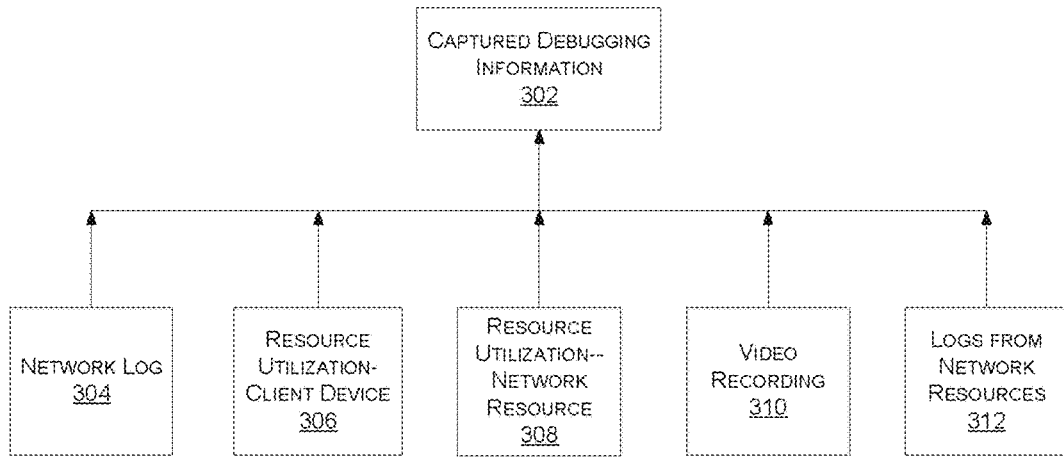
FIG. 3 is a block diagram illustrating different sources of debugging information that may be used to create comprehensive debugging information in accordance with an embodiment of the present invention.

FIG. 3 is a block diagram 300 illustrating different sources of debugging information that may be used to create comprehensive debugging information in accordance with an embodiment of the present invention. In an embodiment, captured debugging information may include information from a network log 304, resource utilization statistics of the client device 306, resource utilization statistics of the network resource 308, a video recording 310 of user activity and logs from network resources 312.

The network log 304 may include intercepted network requests initiated from the client device and corresponding responses received by the client device from the network resource at issue. The network log 304 may also include information associated with one or more API calls initiated from the client device or from the network resource while collecting the debugging information.

The resource utilization statistics of the client device 306 may include memory utilization statistics, CPU utilization statistics, and network utilization statistic associated with the client device. Similarly, the resource utilization statistics of the network resource 308 may include memory utilization statistics, CPU utilization statistics, and network utilization statistic associated with the network resource.

The video recording 310 of the user activity may include a screen video recording of user activities performed on the client device as well as interactions with the network resource at issue. In one embodiment, the video recording 310 includes captures all information presented to the end user by the browser (e.g., browser 104), including user navigation and selection of different menu options from the operation system as well as that of a GUI application associated with the network resource at issue.

In an embodiment, the logs from network resources 312 may include various daemon debug logs, one or more JavaScript console logs, HTTP network logs, and the like. The user of the client device may select one or more logs to be collected from the network resource, for example, via a dropdown menu presented by the GUI of the browser extension. In absence of any selection, all logs associated with the network resources between the first request and second request can be retrieved and added as part of the debugging information.

Figure 4:
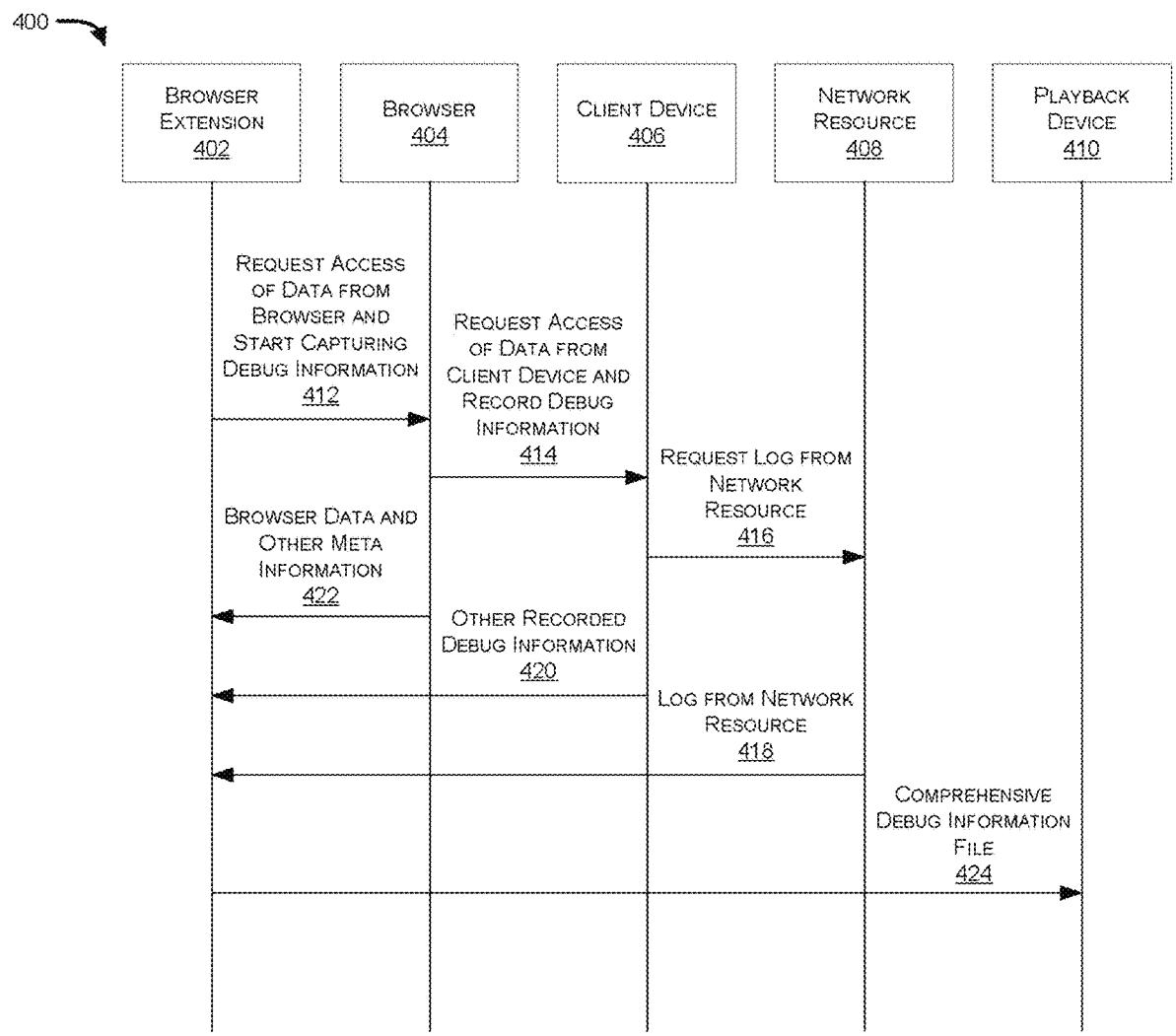
FIG. 4 is sequence diagram 400 illustrating capturing of debugging information for playback in a time-synchronized manner in accordance with an embodiment of the present invention.

FIG. 4 is sequence diagram 400 illustrating capturing of debugging information for playback in a time-synchronized manner in accordance with an embodiment of the present invention. In order for a browser extension to capture the debugging information, the browser extension may request access to debugging information from the browser of the client device, the operating system of the client device, applications or services running on the network resource and the operating system of the network resource being debugged.

In the context of the present example, a browser extension 402 sends a request 412 for desired debugging information to browser 404 and the client device 406 and begins capturing the debugging information. If not all the information requested by the browser extension 402 is available at the browser 404, the browser 404 may request such information from the client device 406. The client device 406 may send a request 416 for logs from network resource 408. All the requested debugging information, such as logs from network resource 418, other recorded debug information 420, and browser data and other meta information 422 are received by the client device 402. The client device 402 may share the debugging information received from multiple sources in a comprehensive debug information file 424 to a playback device 410. As noted above, the comprehensive debug information file may be in the form of a single compressed file containing all the debugging information and associated timestamps.

Figure 5A:
FIG. 5A illustrates a browser web store listing for a debug reporter browser extension that may be used for capturing and reporting comprehensive debug information in accordance with an embodiment of the present invention.

FIG. 5A illustrates a browser web store listing for a debug reporter browser extension that may be used for capturing and reporting comprehensive debug information in accordance with an embodiment of the present invention. A user interface 500 shows the listing for the browser extension that may be used for capturing debugging information, referred here as debug reported extension, at a browser web store. For initial integration of the browser extension with the browser at the client device, a user may add the browser extension by selecting the browser extension from browser web store and clicking the add to browser 504 option.

Figure 5B:
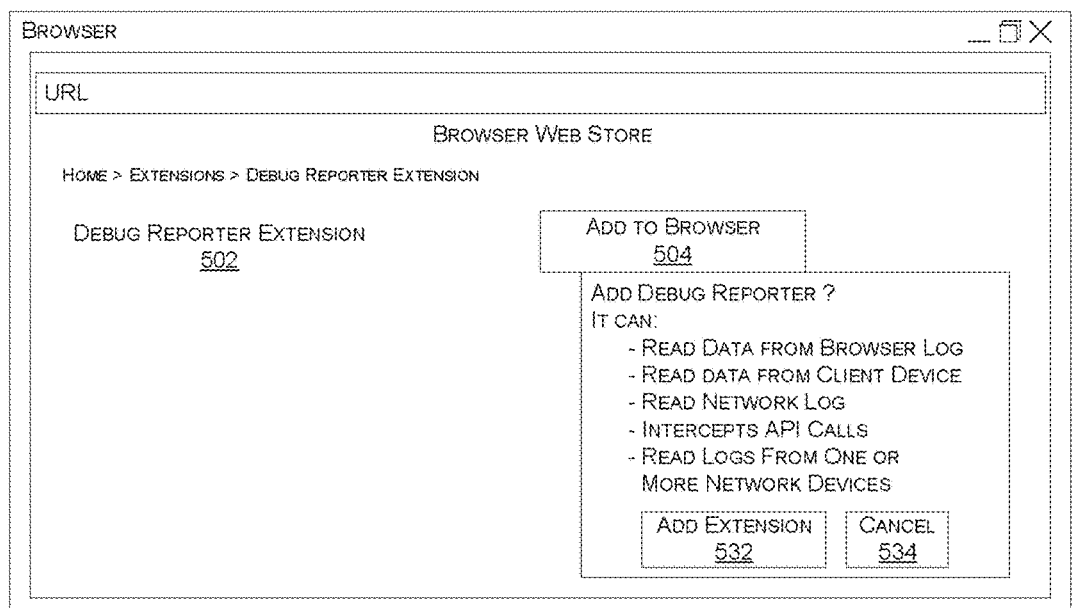
FIG. 5B illustrates various permissions being granted to a debug reporter extension in accordance with an embodiment of the present invention.

FIG. 5B illustrates various permissions being granted to a debug reporter extension 502 in accordance with an embodiment of the present invention. A user interface 530 illustrates various sources of data that may be accessed by the debug reporter extension 502. While integrating or installing the debug reporter extension 502 with the browser, a notification listing various sources of data that may be accessed may be displayed to the user with an option to Add extension 532 or cancel 534. In the context of the present example, permission to access all requested data may be presumed upon user selection of the Add extension 532 button.

Figure 5C:
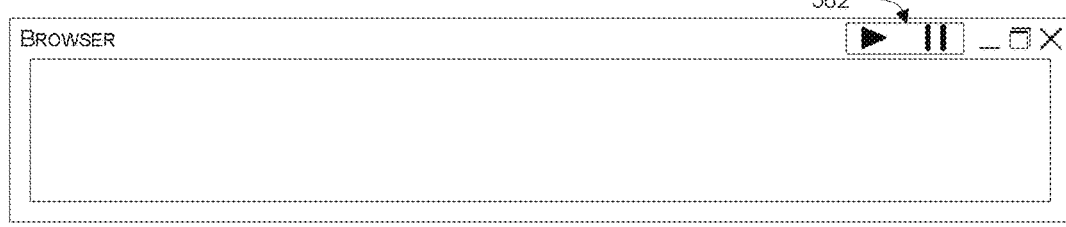
FIG. 5C illustrates a debug reporter extension running within a browser for quick initiation of debug information capturing at a client device in accordance with an embodiment of the present invention.

FIG. 5C illustrates a debug reporter extension running within a browser for quick initiation of debug information capturing at a client device in accordance with an embodiment of the present invention. As shown, through user interface 560, a user may select a start button/icon 562 presented within user interface 560 of the browser extension to start capturing debugging information.

Figure 6:
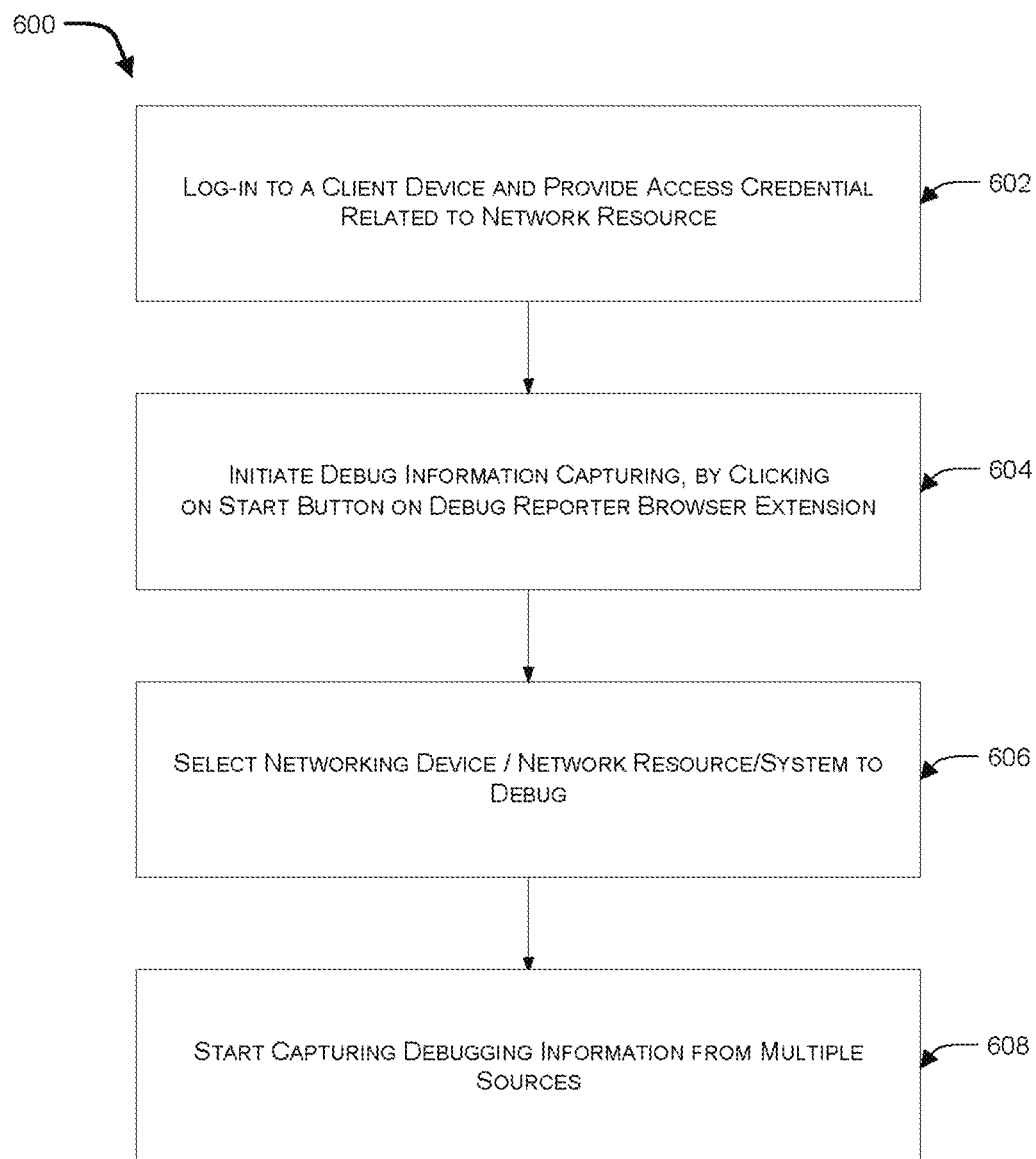
FIG. 6 is a high-level flow diagram illustrating initiation of a debugging information capturing process in accordance with an embodiment of the present invention.

FIG. 6 is a high-level flow diagram 600 illustrating initiation of a debugging information capturing process in accordance with an embodiment of the present invention. In the context of the present example, at block 602, a user logs into to a client device and provides access credentials relating to a network resource for which debugging information is to be collected. At step 602, debug information capturing may be initiated by the user clicking on a start button displayed within a debug reporter browser extension. At block 606, the user may select the network resource to be debugged. At block 608, debugging information may begin to be captured from multiple sources.

Figure 7:
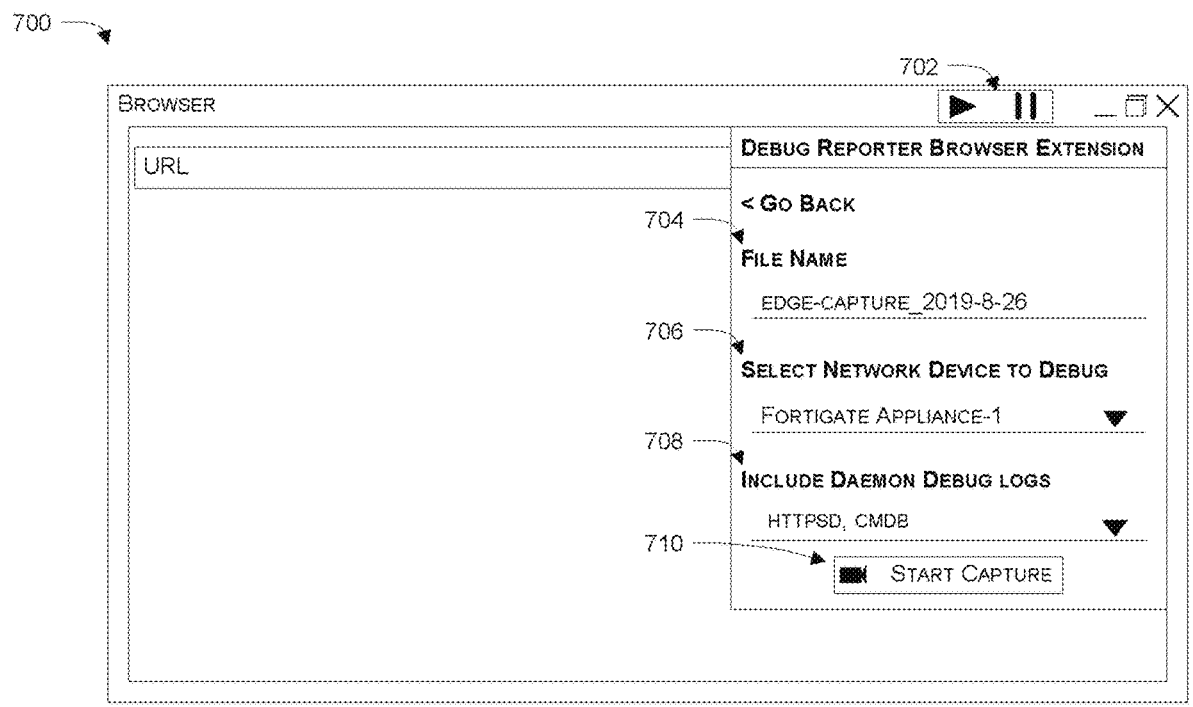
FIG. 7 illustrates an exemplary user interface of a debug information reporter browser accordance with an embodiment of the present invention.

FIG. 7 illustrates an exemplary user interface 700 of a debug information reporter browser accordance with an embodiment of the present invention. In the context of the present example, a user may initiate capturing of debugging information related to a potential bug associated with a network resource by selecting a start capture button/icon 710 associated with a browser extension 702 integrated within a browser running on a client device. Before starting the capture of debugging information, the user may select the network resource to debug 706, include one or more daemon logs 708 and specify a file name 704 for the compressed file that will contain the debugging information. In the context of the present example, the user has selected a FortiGate Appliance named "FortiGate Appliance-1" for debugging, has specified that HTTPS and CMDB logs are to be included within the captured debugging information, and has specified the file name to which the debugging information is to be stored as "Edge-capture_2019-8-26." After the user has reproduced the potential bug by interacting with the network resource and when the user would like to stop capturing the debugging information, he/she may select a stop button/icon of the browser extension 702 or deselect the start capture button/icon 710.

According to one embodiment, after the capture of the debugging information has been stopped, the browser extension persists the debugging information in the form of a compressed file with the name specified by the user. The compressed file containing debugging information collected from the multiple sources can then be shared from the client device to a second device for playback in a correlated manner. In an embodiment, the collected debugging information can be correlated by adding timestamps to the collected information from a uniform time reference.

Figure 8:
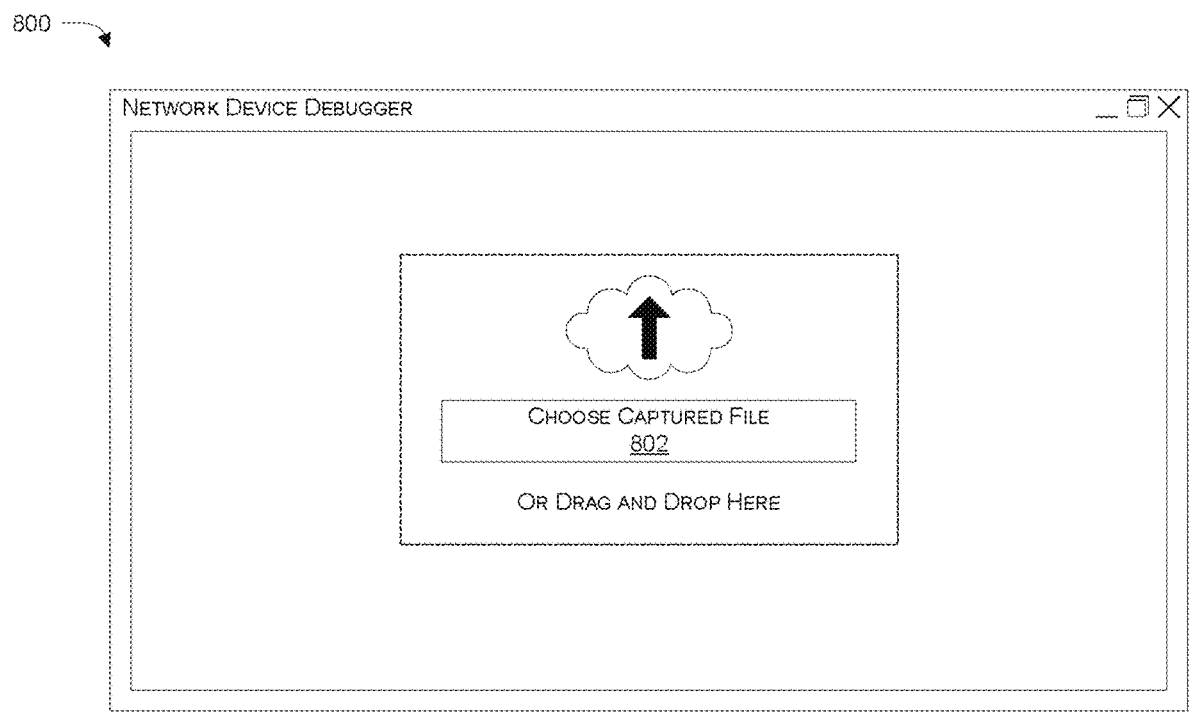
FIG. 8 illustrates an exemplary user interface 800 for enabling a user to playback captured debugging information in accordance with an embodiment of the present invention.

FIG. 8 illustrates an exemplary user interface 800 for enabling a user to playback captured debugging information in accordance with an embodiment of the present invention. A user on a second computer, may upload the a compressed file containing captured debugging information and view the debugging information in a time-synchronized manner. In this manner, user interface 800 allows a user at the second device who needs to understand the bug/issue being reported to playback the debugging information. The user of the second device can select option to choose captured file 802 or drag and drop the compressed file to upload the captured file to the network device debugger. Once the compressed file has been uploaded, the second device can playback the correlated debugging information in a time-synchronized manner. A browser extension or a web application may enable the user on the second device to upload the single compressed file and playback the correlated debugging information.

Figure 9A:
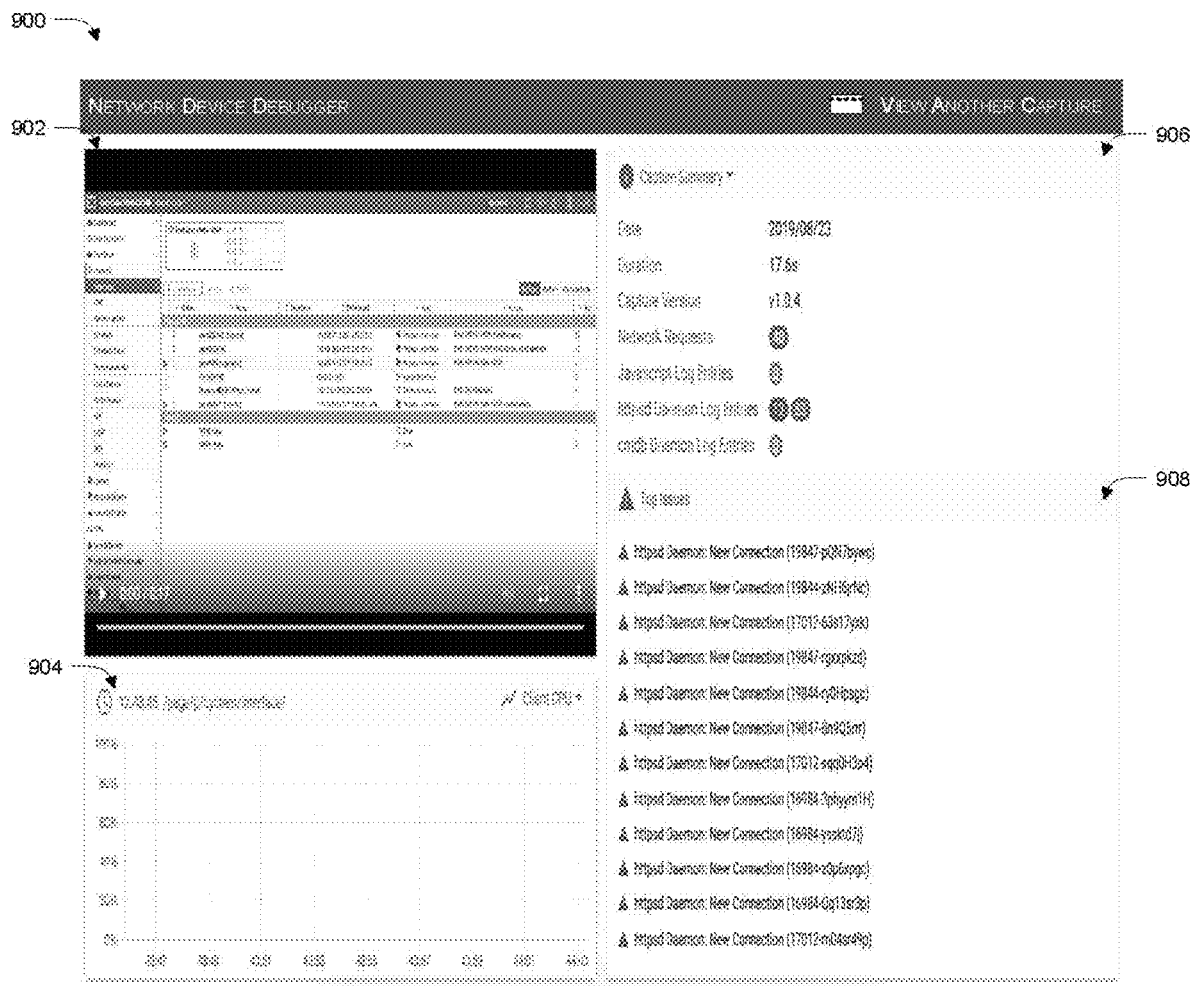
FIG. 9A illustrates an example screen shot of a time-synchronized playback of debugging information in accordance with an embodiment of the present invention.

FIG. 9A illustrates an example screen shot 900 of a time-synchronized playback of debugging information in accordance with an embodiment of the present invention. In the context of the present example, screen shot 900 includes user activities, client device resource utilization, network device resource utilization, client network log, logs extracted from network devices, and meta information through multiple simultaneously displayed windows during playback of debug information in accordance with an embodiment of the present invention. According to one embodiment, the time-synchronized playback simultaneously displays multiple windows, including window 902, window 904, window 906 and window 908, each displaying different information from the captured debugging information. For example window 902 displays a video recording of user activities, window 904 displays a graphical representation of resource utilization data associated with the client device and/or the network resource, windows 906 displays meta information, and window 908 displays top issues identified from different log reports. In one embodiment, a browser extension or a web application at the second device may allow a user of the second device to select different logs to be displayed within a selected window. In an embodiment, once the single compressed file containing the debugging information is uploaded, the browser extension integrated with browser of the second device or a web application may synchronize the playback of the debugging information using the timestamps previously associated with the captured debugging information. As one may observe, window 902 show a GUI related to the network resource (e.g., a remote network security device) displayed at the client device, window 904 shows a graphical representation of resource utilization when the capturing of debugging information started. The state of window 902 at time 00:00 corresponds to resource utilization data displayed at time 12:43:45 in window 904.

Figure 9B:
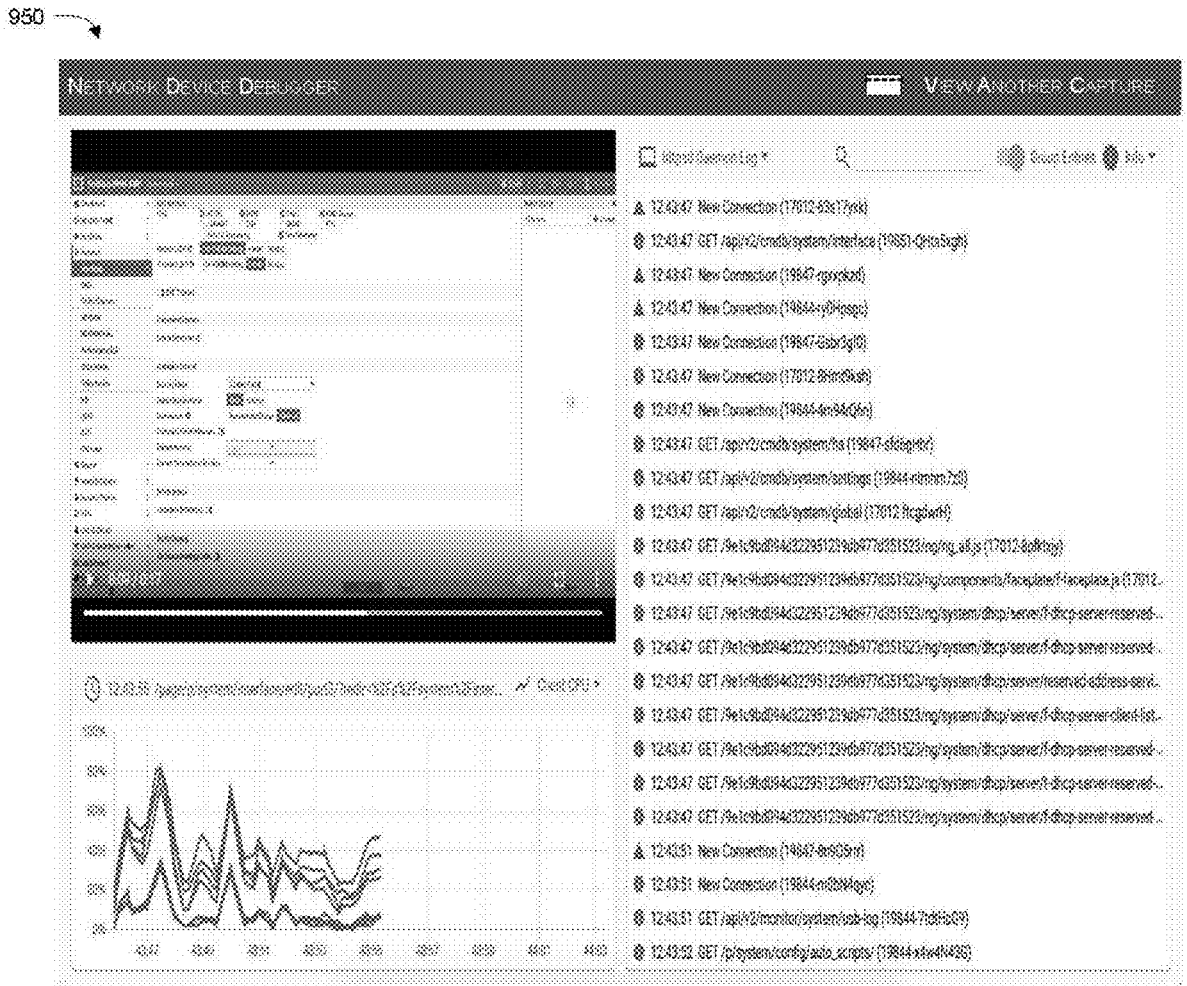
FIG. 9B illustrates another example screen shot of a time-synchronized playback of debugging information in accordance with an embodiment of the present invention.

FIG. 9B illustrates another example screen shot 950 of a time-synchronized playback of debugging information in accordance with an embodiment of the present invention. In the context of the present example, screen shot 950 represents the time-synchronized playback of debugging information depicted in FIG. 9A at a subsequent time. As one may observe as time progress, the user activities depicted may involve a different portion of the GUI related to the network resource at time 0:09 as shown in window 902 and the graphical representation of resource utilization has changed as shown in window 904. As noted above, all of the windows may show time-synchronized data.

Figure 10:
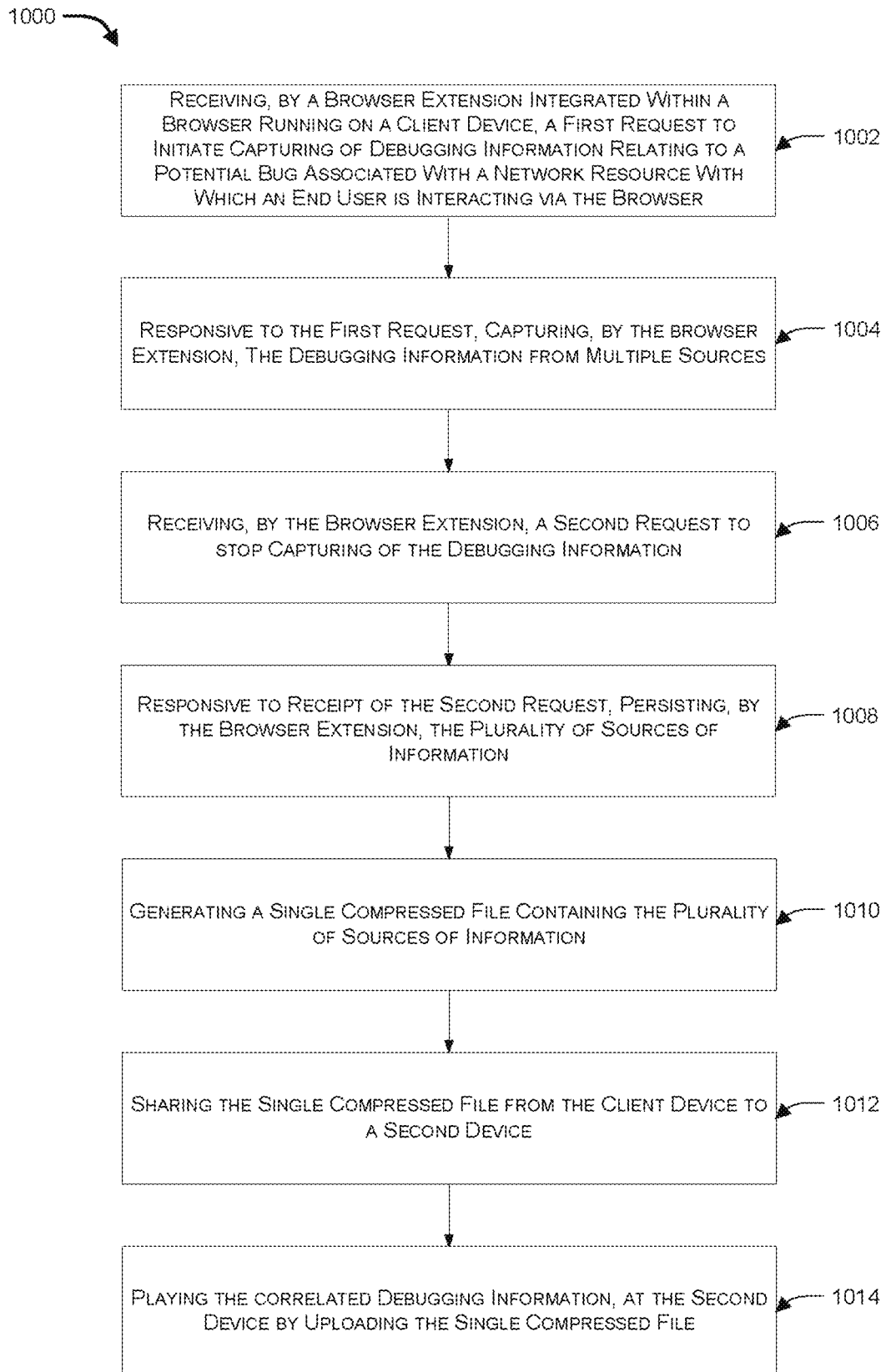
FIG. 10 is a flow diagram illustrating a process of capturing and reporting debug information for to facilitate time-synchronized presentation in accordance with an embodiment of the present invention.

FIG. 10 is a flow diagram illustrating a process of capturing and reporting debug information for to facilitate time-synchronized presentation in accordance with an embodiment of the present invention. The processing described with reference to FIG. 10 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 1100 described with reference to FIG. 11 below.

In the context of the present example, at block 1002, a first request to initiate capturing of debugging information relating to a potential bug associated with a network resource with which an end user is interacting via a browser running on a client device. In an embodiment, the network resource may be a web application running on network security device and the plurality of sources of information may include the information displayed via the browser (e.g., by recording the information displayed by the browser), meta information associated with the network security device, meta information associated with the client device and the browser, HTTP network logs, various debug logs of daemons running on the network security device, JavaScript console logs, and memory and CPU usage over time for the network security device and the client device.

At block 1004, responsive to the first request, the browser extension captures the debugging information from multiple sources. For example, a video recording of information displayed via the browser on a display of the client device depicting the potential bug and real-time user interactions with the network resource leading up to the potential bug may be captured as well as one or more of (a) information regarding utilization of one or more computational resources of the client device over a period of time commencing at a time at which the first request was received by the browser extension; (b) information regarding utilization of one or more computational resources of the network resource over the period of time; (c) Hypertext Transport Protocol (HTTP) network logs containing information regarding HTTP requests issued by the client device and information regarding HTTP responses issued by the network resource over the period of time; (d) meta information associated with the network resource; and (e) meta information associated with one or both of the client device and the browser. In one embodiment, as the debugging information is captured, the browser extension correlates the sources of information by time stamping the received information with reference to a uniform time reference.

At block 1006, a second request to stop capturing of the debugging information is received by the browser extension responsive to which the browser extension persists the sources of information at block 1008. For example, a single compressed file containing the multiple of sources of information timestamped information may be generated and stored within the file system of the client device.

At block 1012, the single compressed file may be shared from the client device to a second device at which the debugging information may be played back at block 1014.

In an embodiment, the potential bug may include a bug associated with GUI used for managing or otherwise interacting with the network resource, network issues, browser code, the network security device, inter-process communication, and any hardware or software issue related to the client device and the network resource.

Figure 11:
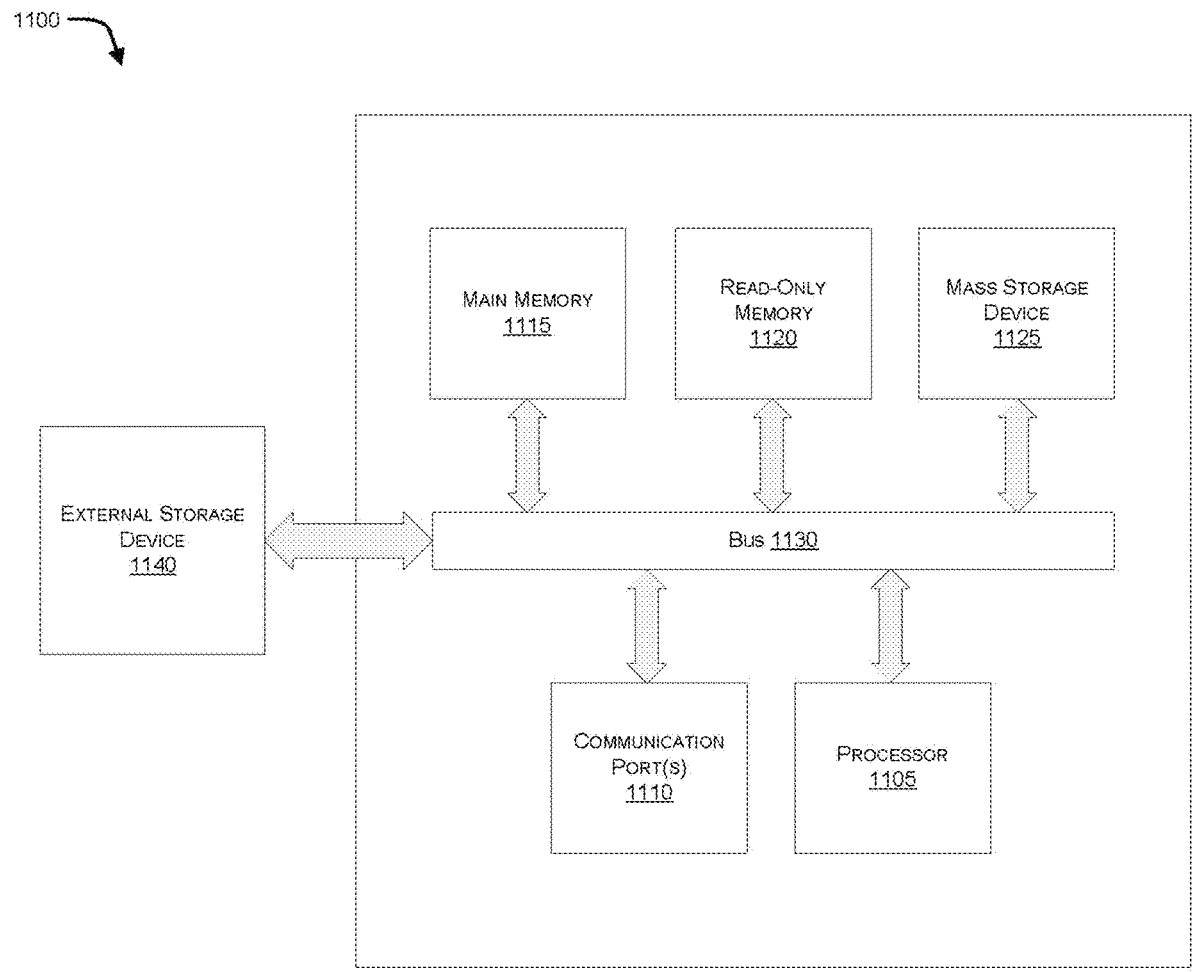
FIG. 11 illustrates an exemplary computer system in which or with which embodiments of the present invention may be utilized.

FIG. 11 illustrates an exemplary computer system 1100 in which or with which embodiments of the present invention may be utilized. Computer system 1100 may represent a client device (e.g., client device 102) in the form of a user workstation, a laptop computer, a tablet computer, a desktop computer or the like.

As shown in FIG. 11, computer system includes an external storage device 1110, a bus 1120, a main memory 1130, a read only memory 1140, a mass storage device 1150, a communication port 1160, and a processor 1170.

Those skilled in the art will appreciate that computer system 1100 may include more than one processor 1170 and communication ports 1160. Examples of processor 1170 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1170 may include various modules associated with embodiments of the present invention.

Communication port 1160 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system connects.

Memory 1130 can be Random Access Memory (RAM), or any other dynamic storage device commonly known in the art. Read only memory 740 can be any static storage device(s) e.g., but not limited to, a Programmable Read Only Memory (PROM) chips for storing static information e.g. start-up or BIOS instructions for processor 770.

Mass storage 1150 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1120 communicatively couples processor(s) 1170 with the other memory, storage and communication blocks. Bus 1120 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1170 to software system.

Optionally, operator and administrative interfaces, e.g. a display, keyboard, and a cursor control device, may also be coupled to bus 1120 to support direct operator interaction with computer system. Other operator and administrative interfaces can be provided through network connections connected through communication port 1160. External storage device 1110 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A computer-implemented method in a debugging playback device communicatively coupled to a data communication network, the method comprising:

gathering debugging information from multiple client devices for playback, wherein debugging information for a specific client device is collected by a browser extension integrated within a browser running on the client device that communicatively coupled to the data communication network, a first request to initiate capturing of debugging information relating to a potential bug associated with a network resource with which an end user is interacting via the browser;

responsive to the first request, capturing, by the browser extension, the debugging information, wherein the debugging information includes a plurality of sources of information including (i) a video recording of information displayed via the browser on a display of the client device depicting the potential bug and real-time user interactions with the network resource leading up to the potential bug; and (ii) one or more of the following:

information regarding utilization of one or more computational resources of the client device over a period of time commencing at a time at which the first request was received by the browser extension;

information regarding utilization of one or more computational resources of the network resource over the period of time;

Hypertext Transport Protocol (HTTP) network logs containing information regarding HTTP requests issued by the client device and information regarding HTTP responses issued by the network resource over the period of time;

meta information associated with the network resource; and meta information associated with one or both of the client device and the browser;

during said capturing, correlating, by the browser extension, the plurality of sources of information by time stamping the plurality of sources of information;

receiving, by the browser extension, a second request to stop capturing of the debugging information;

responsive to receipt of the second request, persisting, by the browser extension, the plurality of sources of information, including generating a single compressed file from the plurality of sources of time stamped information;

sharing, over the data communication network, the single compressed file of debugging information from the client device to the debugging playback device, wherein playing back, at the debugging playback device, debugging information for the plurality of sources of information for at least two of the sources, at the same time, is synchronized by the time stamps.

2. The method of 1, wherein the network resource comprises a web application running on a network security device.

3. The method of claim 2, wherein the plurality of sources of information include debug logs associated with one or more daemons running on the network security device.

4. The method of claim 2, wherein the web application provides a browser-based graphical user interface (GUI) for the network security device.

5. The method of claim 4, wherein the potential bug comprises a potential bug relating to the GUI.

6. A non-transitory computer-readable storage medium embodying a set of instructions, representing a debugging playback device, which when executed by a processing resource of a computer system over a data communication network, causes the processing resource to perform a method comprising:

gathering debugging information from multiple client devices for playback, wherein debugging information for a specific client device is locally collected, including receiving a first request to initiate capturing of debugging information relating to a potential bug associated with a network resource with which an end user is interacting via the browser;

responsive to the first request, capturing the debugging information, wherein the debugging information includes a plurality of sources of information including (i) a video recording of information displayed via the browser on a display of the computer system depicting the potential bug and real-time user interactions with the network resource leading up to the potential bug; and (ii) one or more of the following:

information regarding utilization of one or more computational resources of the computer system over a period of time commencing at a time at which the first request was received by the browser extension;

information regarding utilization of one or more computational resources of the network resource over the period of time;

Hypertext Transport Protocol (HTTP) network logs containing information regarding HTTP requests issued by the client device and information regarding HTTP responses issued by the network resource over the period of time;

meta information associated with the network resource; and meta information associated with one or both of the computer system and the browser;

during said capturing, correlating the plurality of sources of information by time stamping the plurality of sources of information;

receiving a second request to stop capturing of the debugging information; and responsive to receipt of the second request, persisting the plurality of sources of information; and sharing, over the data communication network, a single compressed file of debugging information from the client device to the debugging playback device;

playing back debugging information for the plurality of sources of information for at least two of the sources, at the same time, as synchronized by the time stamps.

7. The non-transitory computer-readable storage medium of claim 6, wherein the network resource comprises a web application running on a network security device.

8. The non-transitory computer-readable storage medium of claim 7, wherein the plurality of sources of information include debug logs associated with one or more daemons running on the network security device.

9. The non-transitory computer-readable storage medium of claim 7, wherein the web application provides a browser-based graphical user interface (GUI) for the network security device.

10. The non-transitory computer-readable storage medium of claim 9, wherein the potential bug comprises a potential bug relating to the GUI.

11. The non-transitory computer-readable storage medium of claim 6, wherein said persisting the plurality of sources of information comprises generating a single compressed file containing the plurality of sources of information.

12. The non-transitory computer-readable storage medium of claim 11, wherein the method further comprises sharing the single compressed file from the computer system to a second device.

13. A debugging playback device, the debugging playback device comprising:

a processing resource; and a non-transitory computer-readable medium, coupled to the processing resource, having stored therein instructions, representing a browser extension integrated within a browser that is communicatively coupled to the data communication network, that when executed by the processing resource cause the processing resource to perform a method comprising:

gathering debugging information from multiple client devices for playback, wherein debugging information for a specific client device is locally collected, including receiving a first request to initiate capturing of debugging information relating to a potential bug associated with a network resource with which an end user is interacting via the browser;

responsive to the first request, capturing the debugging information, wherein the debugging information includes a plurality of sources of information including (i) a video recording of information displayed via the browser on a display of the specific client device depicting the potential bug and real-time user interactions with the network resource leading up to the potential bug; and (ii) one or more of the following:

information regarding utilization of one or more computational resources of the specific client device over a period of time commencing at a time at which the first request was received by the browser extension;

information regarding utilization of one or more computational resources of the network resource over the period of time;

Hypertext Transport Protocol (HTTP) network logs containing information regarding HTTP requests issued by the client device and information regarding HTTP responses issued by the network resource over the period of time;

meta information associated with the network resource; and meta information associated with one or both of the specific client device and the browser;

during said capturing, correlating the plurality of sources of information by time stamping the plurality of sources of information;

receiving a second request to stop capturing of the debugging information; and responsive to receipt of the second request, persisting, by the browser extension, the plurality of sources of information, including generating a single compressed file from the plurality of sources of time stamped information;

sharing, over the data communication network, the single compressed file from the client device to a second device, and playing back debugging information, at the second device, for the plurality of sources of information for at least two of the sources, at the same time, is synchronized by the time stamps.

14. The debugging playback device of claim 13, wherein the network resource comprises a web application running on a network security device.

15. The debugging playback device of claim 14, wherein the plurality of sources of information include debug logs associated with one or more daemons running on the network security device.

16. The debugging playback device of claim 14, wherein the web application provides a browser-based graphical user interface (GUI) for the network security device and wherein the potential bug comprises a potential bug relating to the GUI.

17. The debugging playback device of claim 13, wherein said persisting the plurality of sources of information comprises generating the single compressed file containing the plurality of sources of information.

* * * * *